United States Patent [19]

O'Hare

[11] 4,395,712
[45] Jul. 26, 1983

[54] LINEAR DETECTION OF A DME SIGNAL

[75] Inventor: Edward J. O'Hare, Coral Springs, Fla.

[73] Assignee: General Signal Corp., Stamford, Conn.

[21] Appl. No.: 228,840

[22] Filed: Jan. 27, 1981

[51] Int. Cl.[3] ............................................... G01S 7/32
[52] U.S. Cl. ................................ 343/7.3; 343/17.1 R
[58] Field of Search ........................... 343/7.3, 17.1 R

[56] References Cited

U.S. PATENT DOCUMENTS

| | | | |
|---|---|---|---|
| 3,623,098 | 11/1971 | Jones et al. | 343/17.1 R |
| 3,786,509 | 1/1974 | Applebaum et al. | 343/17.1 R |
| 4,024,541 | 5/1977 | Albanese et al. | 343/17.1 R |

Primary Examiner—T. H. Tubbesing
Attorney, Agent, or Firm—Pollock, Vande Sande & Priddy

[57] ABSTRACT

A DME receiver is arranged to produce, at baseband, a linear replica of an RF input, over relatively wide dynamic range. The DME receiver receives a local oscillator signal from the associated transmitter which is mixed (in a first mixer) with the RF input to produce an IF signal which is a replica of the RF input. The receiver includes an IF amplifier and a bandpass filter serially coupled to the output of the first mixer. Coupled to the output of the bandpass filter is a signal processing circuit with two outputs. The signal processing circuit produces at one output a replica of its input, and at another output a phase shifted and limited replica of its input. Both outputs are coupled to a second mixer. The second mixer has two inputs and an output. By appropriately adjusting the phase of the signal in the signal processing circuit, the phase of that signal (at one input to the second mixer) and of the other signal input to the second mixer are made equal, and as a result, the output of the second mixer is a signal, at baseband, which is a linear replica of the RF input. In one embodiment of the invention, the inputs to the second mixer are at IF and in another embodiment of the invention, the inputs to the second mixer are at a second intermediate frequency, lower than the first intermediate frequency.

5 Claims, 3 Drawing Figures

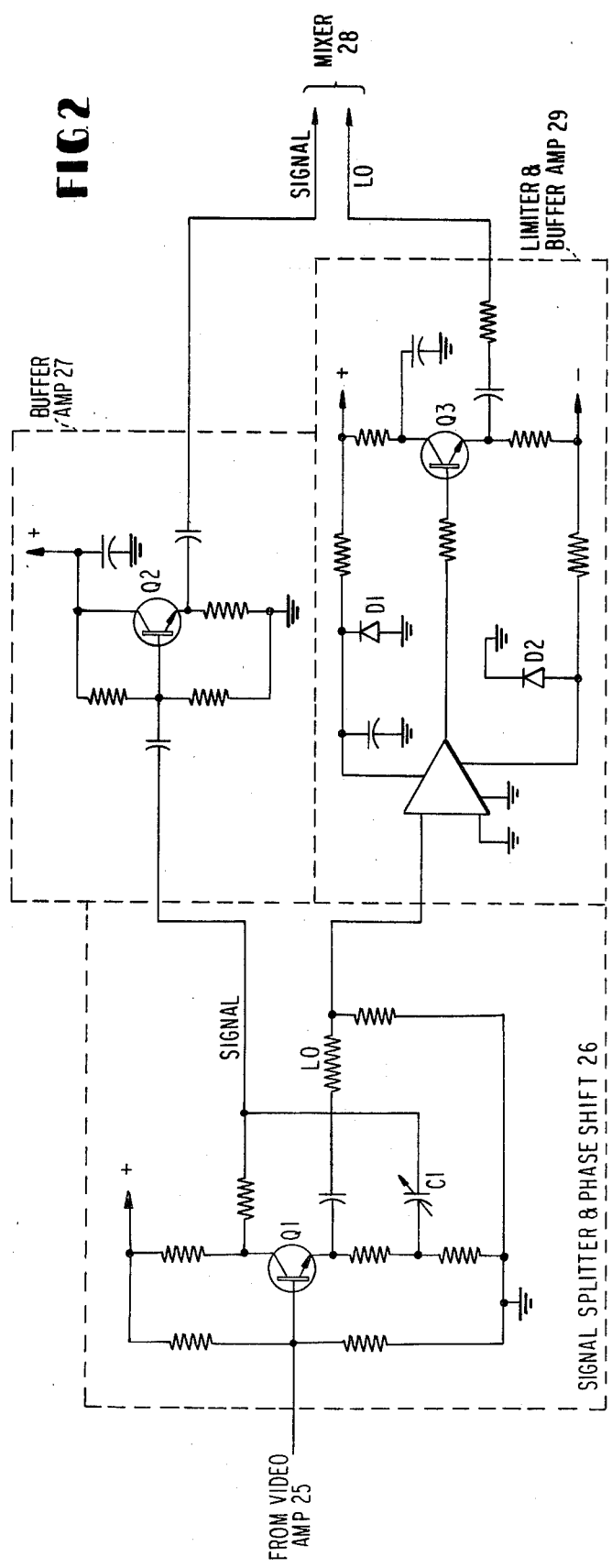
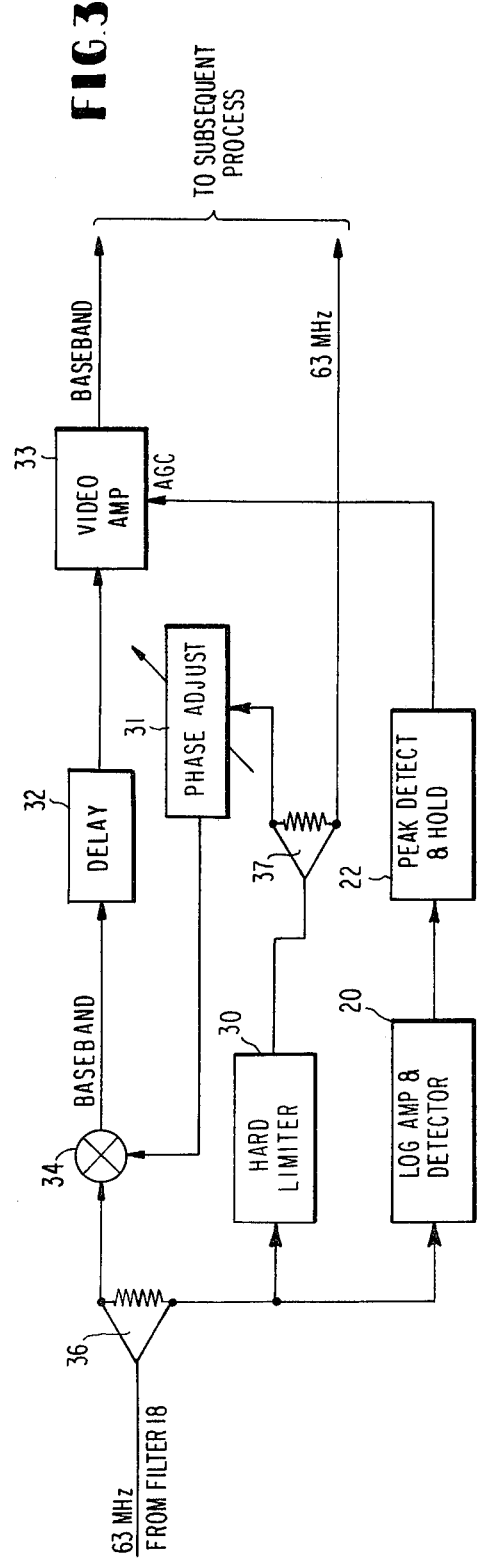

LINEAR DETECTION OF A DME SIGNAL

FIELD OF THE INVENTION

The present invention relates to improvements in distance measuring equipment (hereinafter DME).

BACKGROUND OF THE INVENTION

Information as to the distance between a vehicle and a fixed location such as an aircraft in the vicinity of an airfield, and the airfield itself, is available from equipment which is well known to those skilled in the art. Because of the need for many different aircraft to cooperate with common airfield located equipment to provide this information, the Federal Government regulates the characteristics of such equipment. In addition to the need to minimize bandwidth requirements of such equipment because of competing needs of other RF spectrum users, the DME field is further constrained by the need for equipment to be able to correctly respond to multiple transponders, with messages being transmitted at random times with respect to other messages. To satisfy these stringent requirements, a frequency band in the range 962-1213 MHz. has been set aside for DME operation. DME operation proceeds on an interrogation-reply protocol. An interrogating aircraft transmits, at an assigned frequency, a pulse pair. Upon reception of this interrogation message at the airfield, a reply pulse pair is transmitted. When a reply is received at the interrogating aircraft, delay between the interrogation signal and the reply is used to determine range. The reply signal is offset in frequency from the interrogation signal by a fixed frequency offset. This use of a frequency offset allows the interrogating aircraft to select only the reply generated in response to its own interrogation. Since range is determined by the time difference between interrogation and the corresponding reply it should be apparent that reception of spurious replies may well result in developing erroneous range information and therefore, stringent requirements are placed upon the frequency spectrum of both the interrogation message and the reply message.

As those skilled in the art will be aware, such stringent spectrum requirements result in signals have shapes which are not ideal from the standpoint of generating precise timing points from which measurements can be effected to determine range.

In view of the foregoing, it is quite important for the receiver to be able to detect, within a limited tolerance, the time of arrival of the reply message. Since the reply message is received at RF, the receiver requires apparatus to detect the RF signal and to generate from it a signal which can be employed for the processing necessary to derive range information. So long as the detected signal and the RF signal have a linear relationship, signal processing effected at the receiver will produce an output which can be used as indicating distance to the airfield. Any non-linearity in the relationship between the RF input and the receiver generated replica will obviously lead to errors in the distance indication, and therefore, such non-linearities are sought to be minimized.

It is therefore one object of the present invention to provide, in a DME receiver, an apparatus to produce, from the received RF input, a linear replica, at baseband of the RF signal. It is another object of the present invention to maintain the linearity between the baseband signal and the RF input, over a wide dynamic range.

SUMMARY OF THE INVENTION

These and other objects of the invention are met by providing, in a DME receiver, responsive to an RF input, means for generating a linear baseband replica of the RF input over a wide dynamic range including:
a first mixer coupled to the RF input and to a local oscillator signal,
an IF amplifier and bandpass filter serially coupled to the first mixer,
a second mixer with two inputs and an output, and signal processing means with two outputs coupled to said second mixer for generating a first output signal comprising a replica of said RF input, and a second output signal comprising a phase shifted, hard limited version of said RF input, said signal processing means including phase shift means for phase adjusting said second output signal relative to said first output signal,
whereby said second mixer produces, at baseband, an output which is a linear replica of said RF input.

In a first embodiment of the invention, the inputs to the second mixer are at the IF frequency, i.e., the frequency of the output of the bandpass filter. In this first embodiment of the invention, the output of the bandpass filter is coupled to a two-way power splitter, one output of which is directly coupled to the second mixer, the second output of the splitter is coupled through a hard limiter and phase adjusting circuit to the second input of the second mixer.

In a second embodiment of the invention, the inputs to the second mixer are at a frequency lower than the intermediate frequency of the amplifier and bandpass filter. More particularly, the output of the bandpass filter is also coupled to a two-way power splitter, one of the outputs of the power splitter is coupled to a logarithmic amplifier and voltage detector, and an output of which is coupled through a peak detection and hold circuit, to the control input of an AGC video amplifier. The other input of the power splitter is coupled as one input of a third mixer, the other input to which is at a fixed frequency such that the output of the third mixer is at a second intermediate frequency, lower than the intermediate frequency of the bandpass filter. The output of the third mixer is coupled through a video amplifier and a fixed delay line and provides the signal input to the AGC video amplifier. The output of the AGC video amplifier is a replica of the RF input at the second intermediate frequency. This signal is coupled through a further two-way power splitter, one of the outputs of which, coupled through a buffer amplifier, provides one of the inputs to the second mixer. The other output of the power splitter is coupled through a phase adjusting circuit and through a limiter and buffer amplifier, and provides the second input to the second mixer. Accordingly, the second mixer has inputs provided to it at the second intermediate frequency, and the output of the mixer is, at baseband, a linear replica of the RF input.

BRIEF DESCRIPTION OF THE DRAWINGS

The invention will now be described in further detail to allow those skilled in the art to make and use the same when taken in conjunction with the attached drawings in which like reference characters identify identical apparatus, and in which:

FIG. 2 is a schematic circuit of portions of the block diagram of FIG. 1, and

FIG. 3 is a block diagram of a second embodiment of the invention.

DETAILED DESCRIPTION OF PREFERRED EMBODIMENTS

Figure 1:
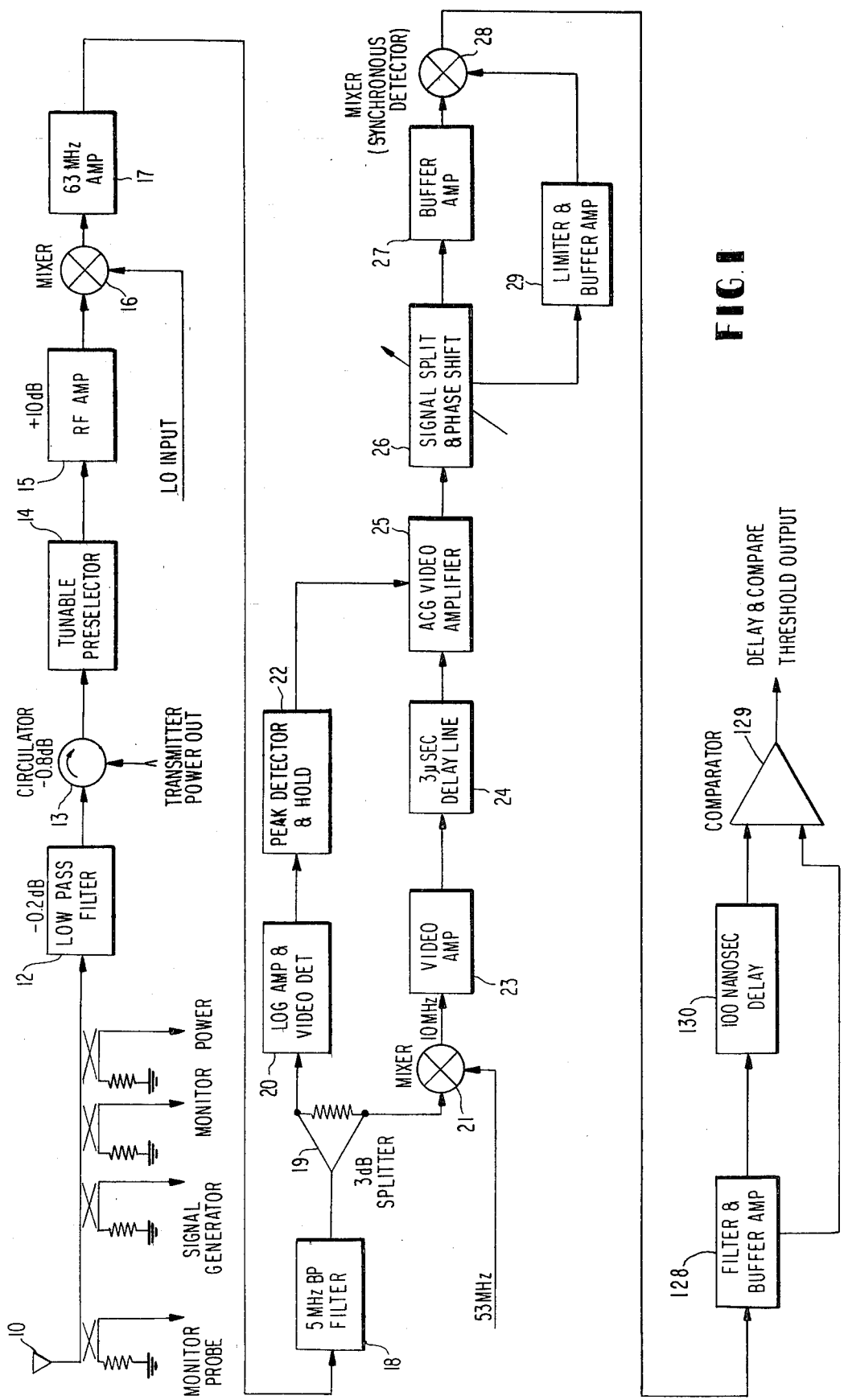
FIG. 1 is a block diagram of one embodiment of the invention.

As pointed out above, it is the goal of a DME Receiver to firstly select an appropriate reply message; this selection is done on a frequency basis. Typically, the reply message is 63 MHz offset, in frequency, from the transmitted interrogation message. Once the reply message is selected and received, it is then necessary to produce from the received RF input, a signal appropriate for processing so as to extract distance information from the delay between transmission of the interrogation message and receipt of the reply message. Since it is the purpose of this system to achieve minimum uncertainty in time of arrival of the reply message, linearity in the receiver is critical. Conventional detection schemes have proven to have a more restricted linear dynamic range than the arrangement disclosed hereinafter.

FIG. 1 is a block diagram of a DME receiver incorporating the present invention beginning at the DME receiver antenna and illustrating the processing used to derive a base band signal which is a linear replica of the RF input constituting the reply message. Subsequent processing, to operate on the base band signal so as to extract distance information is not a part of the present invention and can proceed using techniques well known to those skilled in the art, including techniques used for this purpose in DME equipment which is on the market today.

Although not essential to the invention, the frequency spectrum allocated to DME operations is 962–1213 MHz, and by channel allocation the interrogation message and the associated reply are separated, in frequency by 63 MHz.

As shown in FIG. 1 a receiving antenna 10 provides an input to a low pass filter 12. Various equipment including a monitor probe, signal generator, reply monitor and power divider can be electrically coupled to the connection between the antenna 10 and the low pass filter 12. The output of the low pass filter is coupled to a circulator 13 to which the transmitting antenna (not illustrated) is also connected. The circulator 13 provides an input to a tunable preselector 14 and an RF amplifier 15. The particular transmitter frequency determines the frequency characteristic for the preselector 14 and amplifier 15, i.e., since these are to pass the received reply message, they must be tuned to a frequency which is offset by 63 MHz, from the transmitter frequency.

The output of the amplifier 15 is coupled to a first mixer 16 which has, on another input, a local oscillator signal. By design, the local oscillator input to the first mixer 16 is offset by 63 MHz from the transmitter frequency. As a result, the output of the first mixer is a replica of the received RF input, but with 63 MHz carrier. The output of the first mixer 16 is coupled to a serial circuit comprising a 63 MHz amplifier 17 and a 5 MHz band pass filter 18 centered at the 63 MHz carrier frequency. The output of the band pass filter is coupled to a power splitter 19 which has two outputs, a first output is coupled to a logarithmic amplifier and video detector 20, a second output is coupled to a second mixer 21. As is known to those skilled in the art, the reference to power splitter 19 as a 3 dB splitter indicates that it provides half the input power to each of its outputs. The logarithmic amplifier and video detector 20 provides an output which is a logarithmic representation of the input. This output is the input to a peak detector and hold circuit 22 which is used, in one embodiment of the invention to maintain the peak voltage for a period of 5 microseconds, for reasons which will appear hereinafter. The output voltage of the peak detector and hold circuit 22 provides an AGC input to a video amplifier 25.

The other input of the second mixer is provided by a local oscillator which is arranged to be offset, in frequency, by 10 MHz from the local oscillator input to the first mixer 16. Accordingly, the output of the second mixer 21 is a replica of the RF input, which is now converted down in frequency and centered at 10 MHz. The output of the second mixer 21 is coupled to a series circuit comprising a video amplifier 23 and a delay line 24. The delay line 24 is arranged to delay the signal by a time sufficient to allow the logarithmic amplifier 20 to reach its peak voltage. In one embodiment of the invention which has been constructed this delay is on the order of 2.5 microseconds. The output of the delay line 24 is a signal input to an AGC video amplifier 25. The AGC input to this amplifier is provided by the peak detector and hold circuit 22. Accordingly, the output of the amplifier 25 is a replica of the RF input, with a carrier at 10 MHz.

To convert this signal to base band, in accordance with the invention, a replica of the output of the amplifier 25 is provided as one input to an additional mixer 28. The other input to the mixer 28 (corresponding to the local oscillator) is derived by phase shifting and limiting the output of the amplifier 25. The phase shift is arranged so that the two inputs to the mixer 28 are in phase and accordingly, the mixer 28 performs a synchronous detection function.

To produce this effect, the output of the amplifier 25 is coupled as an input to a signal splitter and phase shifting network 26. One output of the signal splitter 26, the signalling channel, is coupled through a buffer amplifier 27 and provides an input to the mixer 28. The other output from the signal splitter 26 is coupled through a limiter and buffer amplifier 29, the output of which forms the second input to the mixer 28.

As shown in FIG. 1, the signal splitter and phase shift network 36 is adjustable so that the phase shift imparted between the two outputs of the signal splitter 26 can be arranged to ensure that, at the input to mixer 28, the two inputs are in phase.

As a result of the in phase inputs to the mixer 28, its output is a replica of the input from buffer amplifier 27, except that the output of a mixer 28 is at baseband, rather than being modulated on a 10 MHz carrier. Accordingly, the output of mixer 28 is a linear replica of the RF input at the tunable preselector 14, but at baseband rather than at the received carrier frequency. The baseband signal can now be operated on, in conventional manner to obtain the timing information necessary to derive desired distance quantity.

This conventional processing is schematically illustrated in FIG. 1 via the filter and buffer amplifier 128, with a single input, derived from the output of the mixer 28 and a pair of outputs, one feeding one input of a comparator 129, directly, and the other feeding the other comparator input through a 100 nanosecond delay 130.

FIG. 2 provides a schematic for the signal splitter and phase shift 26, the buffer amplifier 27 and the limiter and buffer amplifier 29. It should be apparent that the particular schematic of FIG. 2 is not essential to the invention and that changes can be made to suit various purposes. However, the schematic of FIG. 2 is on which has been constructed and in which the signals passing through the circuits are imposed on the 10 MHz carrier. As is shown in FIG. 2, the input from the video amp 25 is provided to the base of a transistor Q1 which provides outputs at its collector and emitter circuits. The collector output is coupled through a resistor and a variable capacitor C1 to the emitter circuit of the transistor Q1, and it is the variable capacitor C1 which can be adjusted to provide the desired phase shift. The output taken from the collector is denominated the signal channel, and is provided as an input to the buffer amplifier 27. As is shown in FIG. 2, the buffer amplifier 27 input is coupled through a capacitor to the base of a transistor Q2, whose output is taken from the emitter, through another capacitor and provides one input (SIGNAL) to the mixer 28.

The output from the emitter of transistor Q1 is noted LO in FIG. 2 and is coupled to one input of the operational amplifier in the limiter and buffer amplifier 29, the other input of which is grounded. The output of the operational amplifier is coupled through a resistor to the base of transistor Q3. The output of the transistor Q3, taken at its emitter is coupled through a capacitor and resistor to another (LO) input of the mixer 28. For purposes of limiting, the emitter of transistor Q3 is coupled through a resistor to a negative supply potential, which is also coupled through a further resistor to the anode of a diode D2, whose cathode is grounded. In addition, the collector of transistor Q3 is coupled through a resistor to a positive source of potential, and the same terminal is coupled by another resistor to the cathode of a diode D1, whose anode is grounded. The diodes D1 and D2 provide limiting action, thus, the excursion of the emitter of transistor Q3 is limited. Accordingly, the two inputs to the mixer 28 are of identical frequency, although the phase difference between them can be controlled via capacitor C1, the amplitudes may differ via the gain of the operational amplifier in the limiter and buffer amplifier 29 and the second (LO) input to mixer 28 is limited in amplitude excursion. With these inputs, the mixer 28, which can be a conventional mixer, will produce a signal representing the envelope of the one (SIGNAL) input to the mixer 28.

FIG. 3 is a second embodiment of the invention which operates to change the frequency spectrum of the signal being processed directly from the 63 MHz IF to baseband in a single step.

As shown in FIG. 3, the output from the bandpass filter 18 is coupled to a power splitter 36. One output from the power splitter 36 provides the signal input to a mixer 34. The other input is provided to a hard limiter 30 and a logarithmic amplifier and detector 20 which can be identical to the logarithmic amplifier and video detector of FIG. 1. Just as in FIG. 1, the output of this logarithmic amplifier is provided to a peak detect and hold circuit 22 (which can also be identical to the peak detector and hold circuit 22 of FIG. 1) and can be arranged to maintain the peak voltage for a period of approximately 5 microseconds. The output of the peak detector and hold circuit is provided as the AGC input to a video amplifier 33.

The output of the hard limiter 30, is a signal at the frequency of the input (63 MHz) but which is amplified and limited such that it is a constant amplitude signal. The output of the hard limiter 30 which can be in many respects similar to the limiter and buffer amplifier 20, is provided to a second power splitter 37. A first output of the power splitter 37 is a limited version (via the hard limiter 30) of the 63 MHz input signal and is provided to subsequent processing circuitry which is not illustrated as it forms no part of the present invention. The other output of the power splitter 37, however, is the input to a phase adjust circuit 31. The phase adjust circuit 31 can be similar to the signal splitter in phase shift circuit 26 of FIG. 2 except that only a single output signal is required. However, for reasons that are apparent, the phase adjustment provided by the phase adjustment circuit 31 is variable as shown in FIG. 3. The output of the phase adjust circuit is now a hard limited and phase shifted replica of the 63 MHz input signal, and it provides the second input to the mixer 34. The phase adjustment provided by the circuit 31 is adjusted so that, at the inputs to the mixer 34, two signals are in phase. As a result, the output of the mixer 34 will be a baseband replica of the input (at 63 MHz). Actually, it is this output of the mixer 34 which was the original goal of the circuit, but the delay circuit 32 and video amplifier 33 are illustrated to bring the processing as far as the illustrations of FIG. 1. More particularly, the output of the mixer 34 is delayed by the delay circuit 32 for a time sufficient to allow the video amplifier 33 to reach its control voltage. A particular advantage of the embodiment of FIG. 3 is that the delay is imparted to a baseband signal, rather than a 10 MHz signal.

It will be apparent to those skilled in the art that other embodiments of the invention can be constructed by providing for hard limiting and phase shifting such that, a mixer is presented with a faithful replica of the RF input, as one input and, on the other input a hard limited phase adjusted replica, whose phase is adjusted so that the two inputs to the mixer are in phase.

What is claimed is:

1. A DME receiver, responsive to an RF input signal for generating a linear baseband replica of said RF input for distance determining purposes, including:
   a first mixer, coupled to said RF input signal, and to a local oscillator signal,
   an IF amplifier and bandpass filter, serially connected to said first mixer,
   a second mixer with two inputs and an output, and,
   signal processing means with two outputs coupled between said bandpass filter and said second mixer for processing a signal from said bandpass filter to generate a first output signal and a second output signal comprising a hard limited version of said RF input signal, said signal processing means including phase shift means for phase adjusting said second output signal relative to said first output signal, said phase shift means comprising an active circuit element with an input and two outputs, variable reactive circuit means coupled between said two outputs, said two outputs of said active circuit element providing said first and second output signals, respectively,
   whereby with the relative phases of said first and second output signals adjusted, said second mixer produces, at baseband, a linear replica of said RF input signal.

2. The apparatus of claim 1 in which said signal processing means includes
a third mixer coupled between said bandpass filter and said second mixer,
a first input of said third mixer comprising a replica of an output of said bandpass filter and a second input of said third mixer comprising a signal in fixed frequency relation to said local oscillator signal, whereby second mixer has input signals of frequency lower than said intermediate frequency.

3. The apparatus of claim 1 in which said variable reactive circuit means comprises a variable capacitor.

4. The apparatus of claim 1 in which said signal processing means comprises
a power splitter with input coupled to said bandpass filter and a first output coupled to said second mixer, and a hard limiter and phase adjusting means serially connected between a second output of said power splitter and a second input of said second mixer.

5. The apparatus of claim 1 in which said signal processing means comprises
a power splitter with an input coupled to said bandpass filter, amplifying means responsive to one output of said power splitter for supplying an AGC signal, a third mixer with an output and responsive to another output of said power splitter and to another local oscillator signal, fixed in frequency relative to said local oscillator signal, delay means and a video amplifier serially connected to said output of said third mixer, said video amplifier having an AGC input connected to said AGC signal, signal splitter means with an input and two outputs and including said phase shift means connected between said video amplifier and said second mixer, and a hard limiter coupling another output of said signal splitter means and said second mixer.

* * * * *